United States Patent [19]
Sonnenreich et al.

[11] Patent Number: 5,974,446
[45] Date of Patent: Oct. 26, 1999

[54] INTERNET BASED DISTANCE LEARNING SYSTEM FOR COMMUNICATING BETWEEN SERVER AND CLIENTS WHEREIN CLIENTS COMMUNICATE WITH EACH OTHER OR WITH TEACHER USING DIFFERENT COMMUNICATION TECHNIQUES VIA COMMON USER INTERFACE

[75] Inventors: Wes Sonnenreich; Tim Macinta; Jason Albanesc; Robert H. Rines, all of Boston, Mass.

[73] Assignee: Academy of Applied Science

[21] Appl. No.: 08/735,903

[22] Filed: Oct. 24, 1996

[51] Int. Cl.$^6$ ...................................................... G06F 15/16
[52] U.S. Cl. ........................... 709/204; 709/205; 709/203
[58] Field of Search ..................................... 395/650, 330, 395/676, 335; 709/204, 205, 206, 201, 203, 217, 58; 370/260; 707/10

[56] References Cited

U.S. PATENT DOCUMENTS

| | | | |
|---|---|---|---|
| 5,347,632 | 9/1994 | Filepp et al. | 395/200 |
| 5,442,771 | 8/1995 | Filepp et al. | 395/650 |
| 5,740,549 | 4/1998 | Reilly et al. | 705/14 |
| 5,841,976 | 11/1998 | Tai et al. | 395/200.34 |
| 5,862,330 | 1/1999 | Anupam et al. | 395/200.34 |

OTHER PUBLICATIONS

Paul England et al, "Rave: Real Time Servios for the Web," Fifth International WWW Conference, May 6–10, 1996, Paris, France http://www5conf.inria.fr/fich_html/papers/p57/overview.html.

Thane J. Frivold, "Extending WWW for Synchronous Communication", http://www.ncsa.uiuc.edu/SDG/IT94/Proceedings/CSCW/Frivold/Frivold.html, 1994.

Tak K. Woo et al, "A Synchronous Collaboration Tool for WWW," http://www.ncsa.uiuc.edu/SDG/IT94/Proceedings/CSCW/rees/SynColTol.html, 1994.

Elizabeth Thach et al, "Training via distance Learning," Training & Development, vol. 49 p. 44 (3p), Dec. 1, 1995.

Karen L. Murphy et al, Development of Communication Conventions in Instructional Electronic Chats http://star.ucc.nau.edu/mauri/papers/aera97a.html, 1997.

Katie Wulf, "Training via the Internet; Where are we?" Training & Development, vol. 50 p. 50 (6p), May 1, 1996.

Gene Steinberg, Special Edition Using America Online, pp. 1 through 851, Aug. 18, 1995.

*Primary Examiner*—Mehmet B. Geckil
*Attorney, Agent, or Firm*—Rines and Rines

[57] ABSTRACT

A novel user-friendly method of and system for integrating the use of a plurality of different communication techniques for over-the-Internet interfacing between a central server storing a plurality of different information topics and user identification information and a plurality of independent user computer stations which have selected common information topics and are widely geographically separated, for such purposes as information and dialog networking of schools and other groups with common topic interests, and enabling real-time intercommunication amongst such users and with the server, and including growing the information on the selected topics through Internet feedback to the server of user dialog and supplemental information relating thereto; the method creating a virtual common room atmosphere for all the users (such as the same virtual classroom) wherein, irrespective of the diverse geographical locations and actual distances of the varied user stations from one another and from the central server, real-time interactions are enabled amongst all simulating as if the users were all actually in the same room at the same time and participating together.

29 Claims, 5 Drawing Sheets

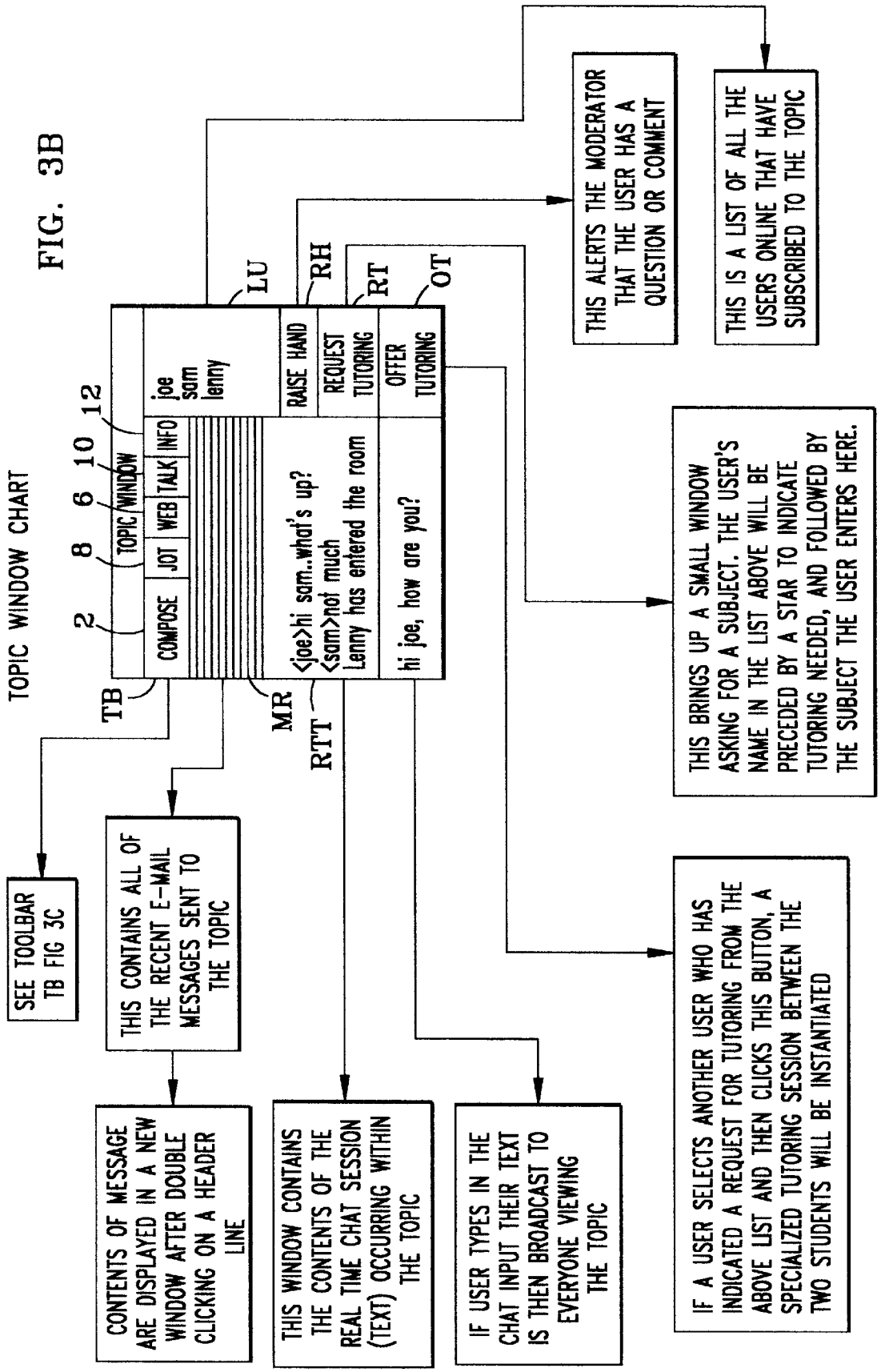

# INTERNET BASED DISTANCE LEARNING SYSTEM FOR COMMUNICATING BETWEEN SERVER AND CLIENTS WHEREIN CLIENTS COMMUNICATE WITH EACH OTHER OR WITH TEACHER USING DIFFERENT COMMUNICATION TECHNIQUES VIA COMMON USER INTERFACE

The present invention relates to the Internet (or similar wide access communication systems hereinafter generically embraced by the term "Internet") providing facility for communication, including information sharing and dialog, including real-time dialog, amongst widely geographically distant and separated computer users; being more particularly directed to the enabling of information and dialog or chatter networking amongst such users as for the purpose of providing user selected information on various topics from a central file server to the user stations and for enabling the users to network with other users also interested in the same topic(s) and with the server—thereby providing for common, and where desired, real time networking of common Internet users and user groups region-wide, nation-wide and indeed world-wide. An important application is for distance teaching and learning and exchange, and for providing a virtual classroom accessible in real-time by geographically separated users, and with real-time interchange simulating an actual single classroom for all.

BACKGROUND

Numerous systems have evolved and are rapidly continuing to evolve for using the Internet as a fountain of information and contacts to impart information of all kinds to computer users, leaving it, however, up to the individual users and their individual resourcefulness or talents to ferrit out the sources of desired information, finding cross-referencing sources, discovering appropriate world-wide web pages, and discovering e-mail and databases and directories and other addresses and identifications. While amazing and exciting in its scope, this process is far from organized, is most time-consuming, with much trial and error and hit or miss, and is largely unintegrated and somewhat user-unfriendly and often discouraging.

Attempts have recently been started at least to simplify topic information and source identification with so-called "object" or icon ("button") selection as with code concepts such as Java (Web Page URL reference http://java.sun.com/doc/index.html). Individual companies have also come up with solutions that link selected communication media together (such as e-mail software and web-page software) in the form of a suite of applications, but still without enabling universal linking of all of the available services through a new interpretation of the universal functionality of such services and their interrelationships as provided by the present invention. For example, in connection with Volatac Iphone (http://www.pulver.com/vocaltec/), service is broken down by topics with limited voice and chat communication and enabling exchange of files over the Internet the topics being used primarily to enable temporal location of similar-interest parties but not for putting resources in a growing framework and adding to topic information resources.

The problem of totally organizing and integrating all the varied communication tools and archives therefor, however, and for the myriad of different possible informational topics of interest (such as the primary communication functions of e-mail, real-time communications and personal information gathering, web access, multi-media representations, custom software, instantaneous messaging, etc.) has, until the advent of the present invention, remained largely unsolved and even largely unapproached.

The present invention is believed to provide a breakthrough in this area, opening up for the first time, the possibility, for example, of completely user-friendly regional, national and global distance education and information-sharing and supplementing such information with individual user contributions to a growing information resource; and with communication with all of the "tools" of varied communication techniques—messaging, archiving and accessing functions all assembled and organized and integrated for user-friendly, self-contained universal use at each user computer station—providing the opportunity for the first real time simplified sharing and networking of, for example, all the similar schools of the land or the globe, or other common interest and facility groups over the Internet—regionally, nationally, and world-wide—and as distinguished from the teleconferencing technology approach.

As earlier stated, an important application of the methodology of the invention is to networking educational instructions and providing distance learning and interchange over the Internet. A brief review of this useage may thus be appropriate before describing preferred implementations.

APPLICATION OF INVENTION TO DISTANCE LEARNING

The present invention expands the concept of distance learning to accommodate the full and now-integrated power and flexibility of the Internet. In order to create a complete and successful distance learning system, however, more is needed than just e-mail, web browsing and video conferencing. Schools need inexpensive teaching materials and resources that can easily be integrated into a traditional classroom setting. The invention enables powerful personal networking software to bring new resources to students and teachers across the country and, indeed, around the world. Imagine, for example, a student in Iowa working with students from New York, Texas and Arizona under the guidance of a professor from Harvard. They're all trying to solve a challenging problem in which each has been given a part of the solution and specialized software to help with their analysis. Rarely does any one high school, for example, have the resources to promote teamwork and problem solving on this level.

The primary goals of this system, termed the Global School District™ system by the assignee of the present invention, the Academy of Applied Science, are as follows:

To create a formal means of networking and communication between schools, such as, for example, high schools To provide high-quality education in subjects that may not be available in every school To give students easy access to mentors and peers in their field of interest To motivate and allow students to look beyond what is offered at their own school To develop teamwork skills The easy-to-use software of the invention provides features that have never before been integrated into one package. On the surface, it provides the following functionality:

A group-oriented system
Online classes
Text-based chat
Email and Zephyr messaging
Online lectures and presentations Heretofore, distance learning has referred to conducting a class in one school to be viewed in one or more other schools located elsewhere. In the past, this has been accomplished through small cable TV networks connecting together several high schools in a region. Ideally, they would allow students to take classes that weren't offered at their school but were at a near-by school. Then, by coordinating classes and schedules, a district of schools could reallocate their resources to minimize redundancies and maximize the diversity of classes offered. In the United Kingdom, university link-ups with digital signal transmission are being tested. These systems were quite expensive and not all efficient, due to the awkwardness of conducting a class session over a TV/video camera set up. The real problem was that they were using a new medium in the same old fashion way.

More recently the possibility of video conferencing over the Internet has sparked a renewed interest in distance learning. Unfortunately almost every type of prior "Internet distance learning" package has exactly the same problem that the cable TV setup had. They are trying to force the technology to simulate the familiar way of teaching and learning—instead of adapting the methods of teaching and learning to the new technology.

There are also some projects offering "do it yourself" classes online—downloading the assignments and submitting the completed ones over the network. These, however, suffer from the lack of feedback and discussion.

Finally, there are a few email and web-based courses that combine real-time discussions with the do-it-yourself style of learning. These are the most effective systems provided before the advent of the present invention, but they are lacking in depth due to the current lack of standards and organization of resources.

There is a serious question, moreover, of the value of spending great sums of money to set up complex hardware and software in order to have video conferencing abilities in high schools when there's no formal way of organizing such a system. Clearly, the main priority should be establishing a network with clearly defined means of communication. The design of the software is purely secondary. Underlying the present invention and the educational thrusts of the said Academy, is to provide a technique to teach high schools (and, of course, other institutions) how to communicate amongst one another and how to share intellectual resources.
Resource Finder
Teambuilder and TeamChallenge Software
World Wide Web browsing with bookmarks for important educational web sites What also makes the system of the invention special is the way in which these features are integrated. The key to the novel software is the concept of a group. A group is collections of people with common interests. When a user logs into the system, he or she will see a toolbar containing a button for each group they belong to. All users are members of their own private "group" which contains a list of the people they know on the system. Classes, fields of interest and hobbies are also represented as groups. Clicking on any one of the group buttons will bring up a new window. This contains all of the actions that can be performed with the group. Each group has an information page which acts as the reference point for the group's archived resources such as presentations, discussions, frequently asked questions (FAQ's) and software.

Groups that represent classes will have additional features such as online test and homework assignments, multimedia lectures and lecture notes. The lectures, homework assignments and tests may be viewed at a student's convenience. Since the students will have many questions about the assignments or lectures, teachers and teaching assistants will hold scheduled online discussion sessions. This will be done through another section of the group's window called the "chat" area. This is a real-time text-based conferencing system. Users type one or two sentences at a time and then send them out to the group. In the chat area their text will show up next to the user name. A session might look like the following:

<joe> So on question two, why is force acting horizontally in the opposite direction of motion?
<Professor Smith> That is the force of friction, which always opposed motion.
<sam> Professor, on question eight . . .

All groups have this feature. Any members that are currently viewing a group's window may participate in its chat session.

There is also provided a list down the side of the group window which contains the name of each member of the group currently online. The list will be sorted such that professors and TA's are at the top, followed by the people the user knows. By clicking on a user's name one can send either an email message or a real-time zephyr message to that user. Email messages are useful for sending long or complex messages that may incorporate graphics, sound, or files from other software packages. These messages can be sent to individual users either online or off-line, entire groups, or even to people on the Internet that are not part of the system. When a new message arrives, a little note appears on the specified group's button in the main toolbar. Personal mail appears within a user's own private group. Within each group window there is a button which brings up a list of email messages sent to it. Selecting a message will display its contents. Zephyrs are much simpler than e-mail since they only handle text. Like email messages, however, they can be sent to users or entire groups. But, zephyrs immediately appear in a separate window on the designated user's screen and only function if the selected user is on-line. Zephyrs are preferable to email for quick, real-time messages, and also preferable to chat since it does not require viewing a specific window in order to communicate. It is possible to block receiving zephyrs from a particular user or zephyrs sent to an entire group.

Groups may contain multimedia presentations that any member can download at any time. For classes, these presentations would be letters created by a teacher. There is a VCR-style interface with which one can pause, fast-forward or rewind the presentation. As the audio plays through there will be numerous images and interactive demonstration that will appear on the user's screen.

One of the major breakthroughs in the software of the invention resides in the ability to incorporate customized software into the lectures. For example, a physics teacher could add a small program that illustrates the laws of motion. Students would be able to pause the lecture and experiment with the software in real-time. Users may create the programs themselves or obtain pre-made software from the group's software library or the Internet. Since this is an advanced topic there is a group devoted to helping users create such software.

The resource finder of the invention allows users to search through all of the people on the system by interests, classes, groups, school, region and/or year. The power of such a system is evident through example. Let's say a student wanted to do a research project on genetics. Few high schools have complex genetics labs on premises. The best way for this student to do his or her project is by finding a professor of genetics at a nearby university to act as a mentor. This task is made trivial with the resource finder of the invention.

Finally, the software of the invention encourages team-building. One of the things lacking most from high school education is teamwork. It has always been hard for teachers to explain the fine line between collaboration and cheating. Many simply ignore the benefits of learning how to work in teams in order to avoid this issue altogether. Our system puts students from diverse geographic backgrounds together into teams and then gives them challenging problems to solve together. The benefits of learning how to function as a team, coping with the problems of distance, cultural differences, and differences in capabilities, are self-evident.

The World Wide Web is a major means of communication and information dissemination. Therefore the invention, in preferred form, provides both Netscape and the Internet Explorer with its software. All forms of text can include web pages references, which when selected will call up a web browser. In addition, a list of great educational sites broken into subject are provided, these bookmarks being included with the software and will be continuously up-dated.

From the user's end, the Global School District system is accessed through custom software through which the student can access the services. The software uses an Internet connection to communicate with a main or central server, currently in Boston. This is like a giant conference call in that anyone connected to the system will be able to communicate with anyone else online; the software, moreover, updates itself automatically. When a new release is available, it detects and does all of the necessary installation. It has been carefully designed so that the viruses cannot get into system. Preliminary tests with simultaneous school users in Oregon, New York and Cambridge have proved the feasibility and utility of the methodology.

OBJECTS OF INVENTION

The present invention, thus, has as a primary object, the provision of a new and improved method of and system for integrating the use of the plurality of different Internet-useable communication techniques for communicating, over the Internet, pluralities of different and varied information topics to a plurality of widely geographically distant and/or separated independent user (client) computer stations from one or more central file servers storing server information topics and interested user identification information, not only to enable common access to selected information topics, but to network and allow ready intercommunication also amongst the computer user stations, including growing the topic information database at the server by contribution from the users.

A further object is to provide such a novel technique and system that organize access by each computer station user, with common screen "buttons" and preferably "object" icons, not only to the central server(s), but to readily identify similar interest users and without the necessity for resort to searching different sources, databases or directories, either for topic information or for identification and addresses of other interested users—and all on a single common type screen display.

Still an additional object is, through the invention, for the first time, to make regional, national and global, self-contained accessing networking of similar interest and function groups readily feasible and highly user-friendly, opening up the whole new areas of school networking and information, program, teaching, virtual laboratory and other facility sharing over the Internet, but also such networking for a myriad of other common interest groups—far less expensive and more flexible and far-reaching than current teleconferencing and the like—and even pointing the way to facilitating such national goals as elections, referenda and other common mass input activities.

An important object application is to provide over the Internet, a novel virtual classroom, where users in widely separate locations access and participate in a simulated classroom environment listening and viewing presentations, interactive questioning and dialog, etc. in real-time just as if they were all actually physically in a common classroom.

Other and further objects will be explained hereinafter and are more particularly pointed out in the appended claims.

SUMMARY

In summary, however, from one of its important aspects, the invention embraces a method of organizing and integrating the use of a plurality of different types of Internet information and dialog communication techniques and for each of a plurality of different informational topics stored in central file server(s) interfacing through the Internet with a plurality of widely geographically distant and/or separated and independent user computer stations, that comprises, storing at such central file server(s) a database containing (1) an index of a plurality of different informational topics, and (2) a personal information and identification directory on all the users of the plurality of user computer stations including their specific selected informational topics of interest;

storing also at such central file server(s) the files and other detailed information pertaining to each informational topic indexed in the database; providing each user computer station with similar software that generates a common type screen at each station containing selectable "buttons" for personal user identification and for each different information topic selected as of interest to the user; enabling said software, upon a user selecting a topic "button", for thereupon generating a screen pattern of common format for each topic containing four primary selections:

(1) a "tool" bar section of "buttons" selectable by the user on the screen and representing different primary communications function modes, including a plurality selected from the group consisting of e-mail, multi-media presentations, web-access, instantaneous messaging, real-time communication, personal information gathering, and custom software, (2) a message reader section displaying all e-mail messages sent by other users interested in the same informational topic, (3) a real-time text base communication-chatting or dialog section, and (4) a list of all the users who have selected the same information topic as of interest and who are currently on-line, cross-referenceable and configurable to specific of such users already known to or desired by the user;

the software further providing on said screen pattern, a web-browsing window tuned to a topic-specific web page; and wherein, as the user logs in, the user's personal identification and information is identified in the central server file database and the user screen topic "buttons" are customized by the server to those topics of interest selected by the user and stored in said database; and, upon the user selecting a topic "button" and there—upon generating said screen pattern, searching for all stored data on that topic; and, upon the user selecting a desired communication function mode from the "tool" box section, communicating such data from the server in the appropriate user-selected communication mode over the Internet to the user screen.

Preferred and best mode techniques and embodiments will be later presented.

BRIEF DESCRIPTION OF THE DRAWINGS

The invention will now be described with reference to the accompanying drawings, FIG. 1 of which is an overall block diagram of a system embodying the methodology of the invention in preferred form, and shown applied to the illustrative application of a "global" school program—such to be understood to be an exemplary illustration and by no means intended to be limited in scope, the invention rather being applicable to a myriad of other fields of application, as earlier discussed;

FIGS. 3A–3C are similar more detailed software program processing flow chart and block diagrams explanatory of the implementation of the system of FIGS. 1 and 2.

DESCRIPTION OF PREFERRED EMBODIMENT (S) OF INVENTION

Figure 1:
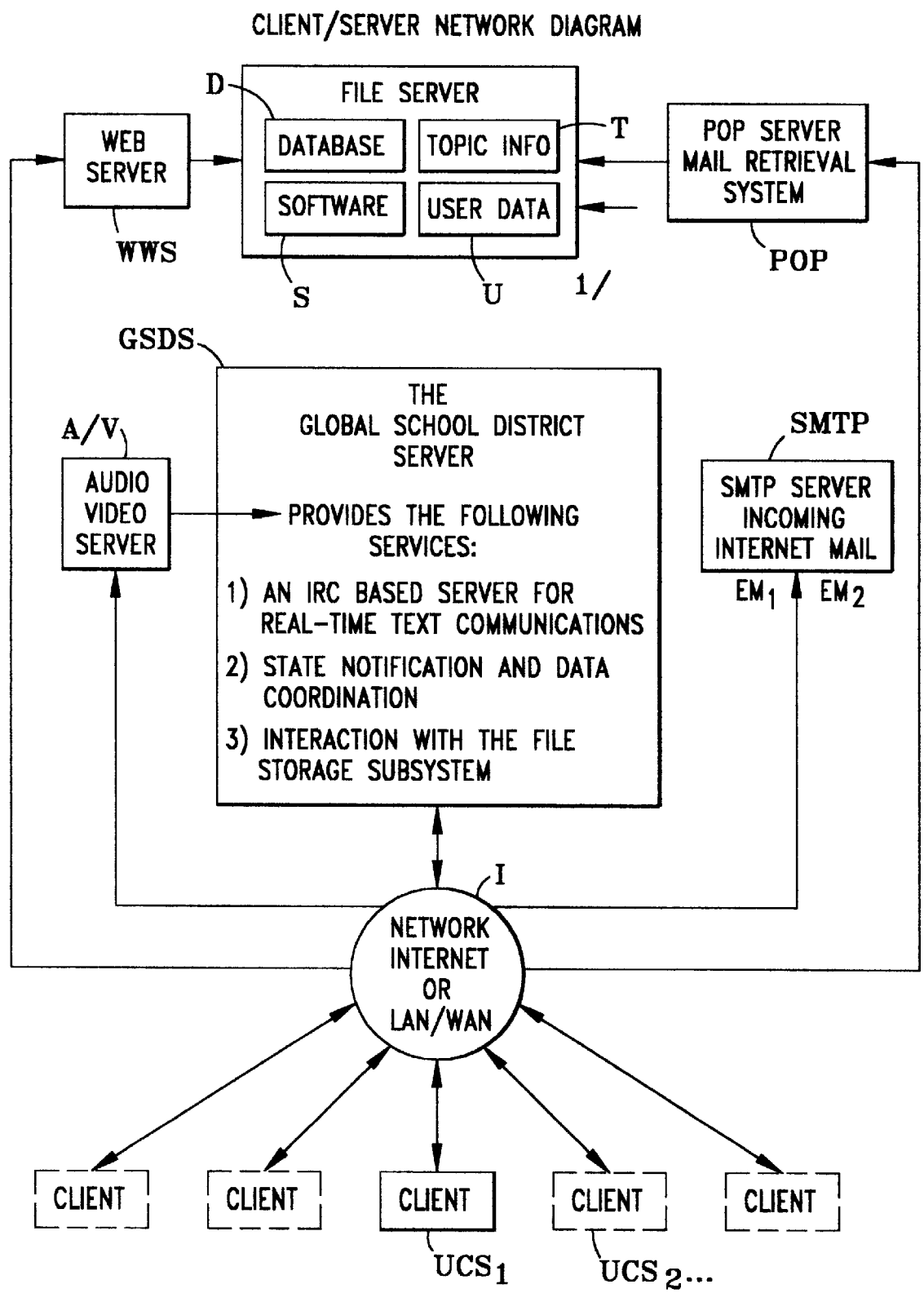

Referring to FIG. 1, the exemplary illustration of the invention as applied to educational systems is shown depicted as comprising one (or more, if desired) central file server 1 having a data base D storing an index of a plurality of different information topics T (such as different educational subjects for schools, or for other groups as well, various common interest subjects, topics, lectures or presentations) and a personal user information and identification directory U (including, for example, e-mail and other addresses), and the specific user-selected information topics of interest to the user, together with stored files and other detailed information pertaining to each such informational topic indexed in the server database D, and suitable software S, later discussed, for retrieving data on user computer-station log-in and topic and Internet communication type mode selection.

Various communication support servers that handle data transmission for the plurality of different types of modes of communication over the Internet as selected by each of the user clients are provided, shown as a world-wide web server WWS for handling web page data; POP and SMTP (Standard Mail Transport Protocol) servers for handling distribution and retrieval of asynchronous e-mail, designated $EM_1$ and $EM_2$, respectively; and with adaptability for real time audio/video communications AV; and the real-time synchronous chatting and messaging server GSDS on the IRC Protocol which also coordinates all the above servers for the purpose of servicing requests from the client-user station software, while maintaining internal state information (i.e. who is logged in and tracking internal activities, etc.), and file storage retrieving and storing of all topic and user information. Suitable types of the above are described in the following Web Page URL references:

Re the Internet, and all of its components, protocols and services, including the Web,
email (POP & SMTP) IRC, Java, servers, etc.;
http://freesoft.mesa.net/Connected/Topics/index.html;
Re The Client-Server Architecture
http://www.interpac.net/-clientserver/;
Re Java
http://java.sun.com/doc/index.html;
Re Object Oriented Programming
http://uu-gna.mit.edu:8001/uu-gna/text/cc/Tutorial/tutorial.html
Zephyr communications (the Jotter)
http://www.csc.ncsu.edu/departmental/tour/eosbasics/midasandzephr/midasandzephy.main.html;
Re Audio and Video Streaming
http://www.prognet.com/prognet/rt/protocol.txt.

All of this is shown connected to the Internet I for communication with pluralities of client-user computer stations $UCS_1$, $UCS_2$, etc., widely dispersed or located geographically, regionally, nationally and world-wide. At each of the client-user computer stations $UCS_1$, $UCS_2$, etc., FIG. 2, the provided software, on user log-in, generates a log-in screen C. If a first time user, a new-user profile screen is provided for establishing identity, user name (e-mail), pass word, location, and selected informational topics of interest, as well as other personal information and identification, as later more fully described in connection with FIG. 3A. This information is transmitted back over the Internet I to the central server 1, and, upon identification of validity, the user is granted access to the system via return to the log-in screen at the user station which now displays the user name. When the user's name and password are furnished by the user in the log-in, the server verification system allows the software loading to continue. The user then sees an introduction screen E which, for U.S. schools, can contain the customary classroom opening-day pledge of allegiance to the flag. Upon dismissal of this screen, the main interface screen F comes up containing a menu bar and a selection of "buttons" representing the user-selected topics of interest effected as in Java "object" code (see http://java reference, above).

The system menu allows exiting the software. The user menu option contains facility for changing user profile, if required, and searching the central server database D of FIG. 1., as more fully delineated in FIG. 3A. There is also a "help" menu option for providing real-time contact-sensitive help on software usage.

Figure 2:
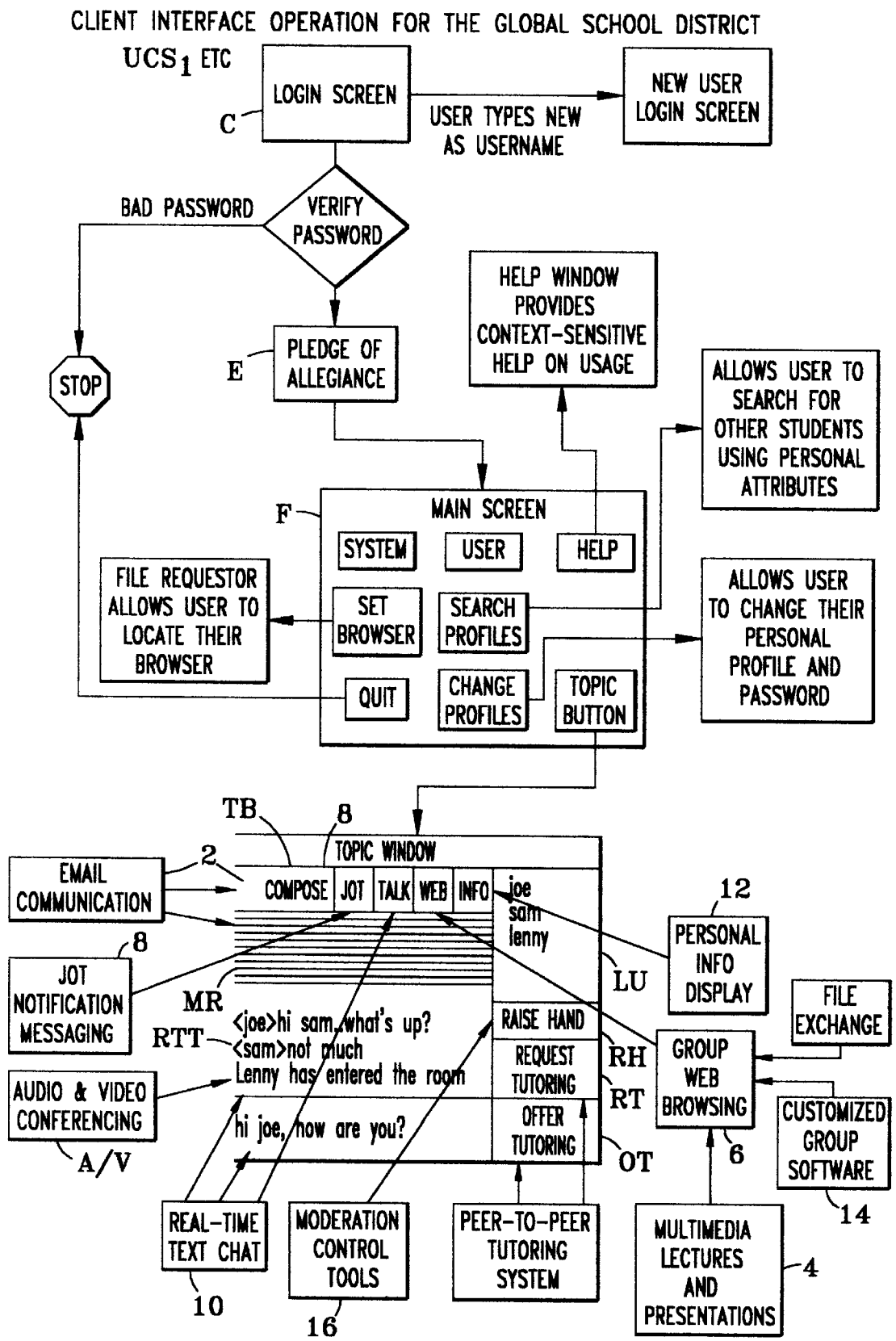
FIG. 2 provides combined block and flow chart diagrams of the client-user computer station system and software control for integrating, over the Internet, with the central server and with other users of common specific topic information interest, as if in the same room together.

Upon selection of a topic button, a screen pattern is generated having four sections. First, a tool bar/or bar section TB of icon buttons that enables each user of the common topic interest group selectively to activate the different primary types of communication modes including e-mail 2, multi-media presentations 4 (integrated through web-browsing), web access 6, instantaneous (jot) messaging 8, real-time communication 10, personal information gathering 12, and custom software 14 FIG. 2; and also tools 16 for controlling, moderating and configuring the system for small size, large size, or select or special groupings and ordering interaction, and tailoring other user's perception of the software. The before-mentioned common format screen pattern for all users is shown at the bottom of FIG. 2, as implemented by said software, and it assures that every user can automatically observe every other users communications by their respective selected communication mode, synchronous or asynchronous (2, 4, 6, 8, 10, etc., above discussed), and irrespective of the particular communication mode pre-selected by a user at that time.

A teacher, for example, wants control during a lecture without interruption; or perhaps only a small group is to be involved; or it may be desired to guide everyone through the same sequence, etc. Audio/video conferencing 18 and file exchange 20 are also provided for as tool bar selections. Additional buttons on the tool bar TB in the Topic Window, as shown in later-described FIGS. 3B and 3C, will help teachers and students communicate during a lecture. The first button is a "raise hand" button RH. During a lecture or a question and answer session, the teacher will be the only one that can send messages to everyone in the class. This will prevent too many people from talking at once. If a student or other user has a question or wants to talk, they can hit the "raise the hand" button. This notifies the teacher or other leader that the student has a question. The teacher could then activate the student's chat window, and whatever the subject type is broadcast to everyone in the class.

If, on the other hand, a class has too many people, the teacher will eventually become overwhelmed with questions, or will constantly end up answering similar questions. Thus, the invention provides for letting students (or other users) help one other. There will be two other buttons, "offering tutoring" OT and "request tutoring" RT and a window with a list that contains the student's (user's) name and a brief subject for the question. This way, when a student has a question that may have been answered before, they can first place their question in the "tutoring" queue. The term "tutoring" is intended generically to embrace explanation or learning or information assistance or supplementing. When a student (or other user) selects "request tutoring", a subject for the question is entered by the student typing on his or her own, or choosing from a list supplied by the teacher. Once a student has done this, every student will see a new request in the list for tutoring. If a student wants to answer another student's question, he or she simply clicks on the student's name from the list and then clicks on "offer tutoring" OT. This creates a new window with a private chat session between two students (users), not only providing learning assistance, but giving students (or other users) a chance to meet one another and to learn how to assist one another.

The screen pattern also contains a message reader section MR, displaying all email messages sent by other users along their selected communication modes interested in the same selected topic. A third section for real-time text base communication display is shown at RTT. The fourth section LU lists all users who have selected the same information topic and who are on-line, enabling cross-referencing and configuring to specific of the users known to or desired by the user with the aid of the before-described moderating and configuring tools 16—controlling those who have access to storing and editing topic-specific information and who is selected for particular groups, etc. as previously described. The web-browsing window web access 6 is tuned to topic-specific web pages.

Figure 3A:
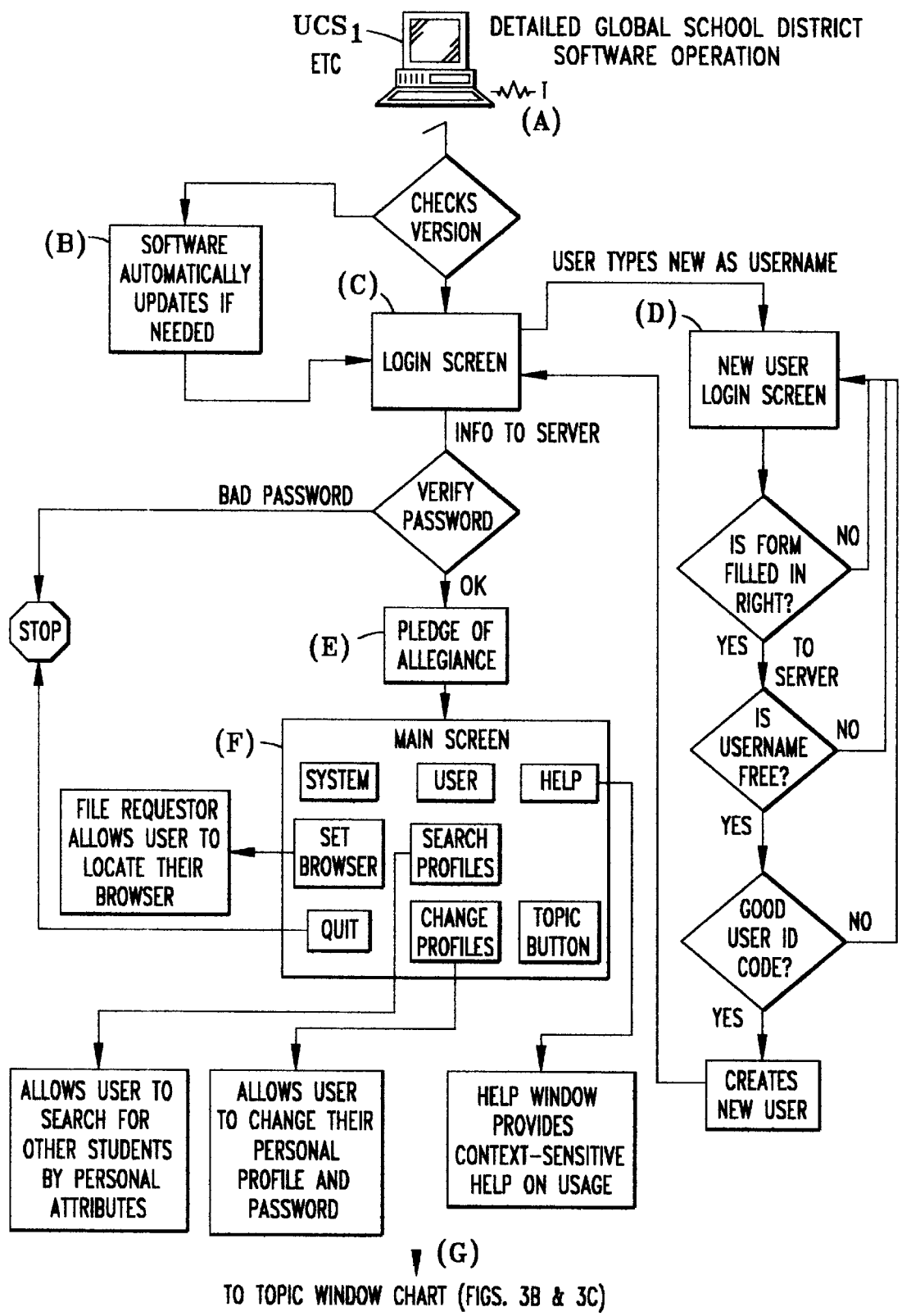
Figure 3C:
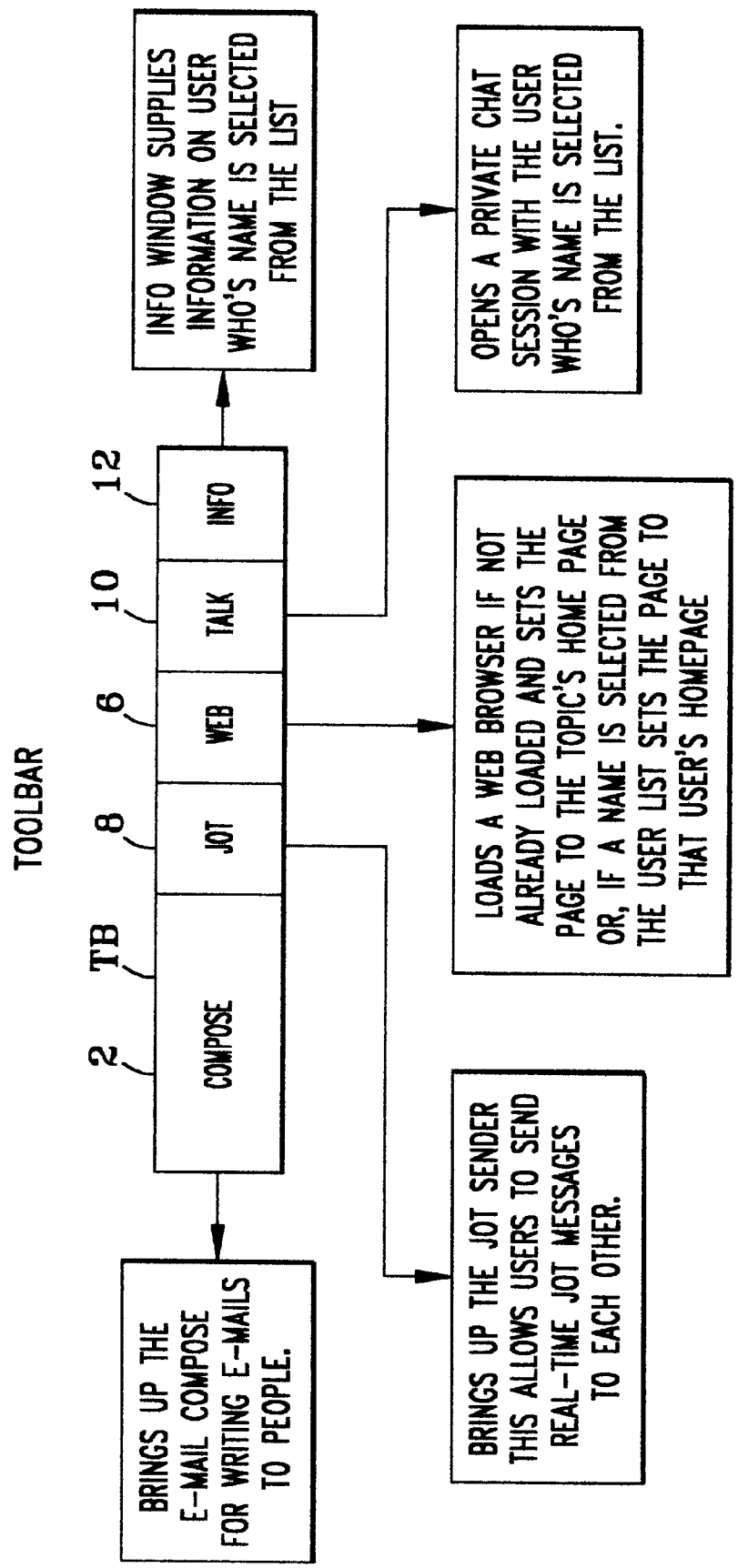

A more detailed description of the novel software programming and system processing above-described is presented in the combined block and flow diagrams of FIGS. 3A–C. As outlined in FIG. 3A, the user station software enables establishing connection over the Internet with the central server (step A), with facility for up-dating files (B) and then presentation of the log-in screen (C). The routine for a new user-server log-in and an already subscribing user validation is outlined at (D), whereupon the opening function, such as the classroom pledge of allegiance customary in US schools, is presented (E). The main screen is then presented (F), with the user-selected topics displayed as configured from the server database as previously described, with several ancillary user options including setting the web browser, requesting help, window display for searching for others of common interest or attributes, and providing facility for the user to change his or her personal information and profile material for the server database directory—all as labeled in FIG. 3A.

The user is now ready to select (G) the topic (subject) of interest on the main screen by "pressing" the appropriate button (i.e. mouse or touch screen, etc.) The selected main interface topic window screen then appears, as before described, providing the previously described "tool box" section TB (FIG. 2), and with the further "raise hand" RH, tutoring requested RT and tutor offering OT button features, so useful for classroom applications and other group conferencing or learning applications, as well.

The specific operational function of the buttons of the toolbar TB are more fully described in the legends of FIG. 3C.

Considering the application to the "Global School District", i.e. providing a common school with user subject or topic selection, a virtual classroom atmosphere is created where the software provides the same kind of setting as a real classroom in that all the interactions amongst students and teachers are available in real time (as well as student-to-student and/or teacher-to-teacher), simulating an on-line classroom as if the diversely geographically located users were in the same room. Access to the user's software is the opening of the classroom door and sitting at the desk to participate, letting everyone behave in real-time as if they were all in the same room.

While reference has herein been made to "Internet", it appears that the volume of information may ultimately be handled by connecting groups of computers networking (wide area network—WAN) or private wide area networks or local area networks (LAN), themselves interconnected to the Internet—networking clusters to reduce traffic and increase speed.

As before stated, the integrating features and user friendly techniques of the invention are widely useable, and various desired implementations of software can attain the same basic novel methodology of the invention, such and other modifications being readily suggestible to those skilled in this art, and being thus considered to fall within the spirit and scope of the invention as defined in the appended claims.

What is claimed is:

1. A method of organizing and integrating the use of a plurality of different types of Internet information and dialog communication techniques and for each of a plurality of different informational topics stored in central file server(s) interfacing through the Internet with a plurality of widely geographically separated and independent user computer stations, that comprises, storing at such central file server(s) a database containing (1) an index of a plurality of different informational topics, and (2) a personal information and identification directory on all the users of the plurality of user computer stations including their specific selected informational topics of interest;

storing also at such central file server(s) the files and other detailed information pertaining to each informational topic indexed in the database, providing each user computer station with similar software that generates a common type screen at each station containing selectable buttons for personal user identification and for each different information topic selected as of interest to the user; enabling said software, upon a user selecting a topic button, for thereupon generating a screen pattern of common format for each topic containing four primary selections:

(1) a "tool" bar section of "buttons" representing different primary communications function modes including a plurality selected from the group consisting of e-mail, multi-media presentations, web-access, instantaneous messaging, real-time communication, personal information gathering, and custom software, (2) a message reader section displaying all e-mail messages sent by other users interested in the same informational topic, (3) a real-time text base communication-chatting or dialog section, and (4) a list of all the users who have selected the same information topic as of interest and who are currently on-line, cross-referenceable and configurable to specific of such users already known to or desired by the user;

the software further providing on said screen pattern a web-browsing window tuned to a topic-specific web page; and wherein, as the user logs in, the user's personal identification and information is identified in the central server file database and the server customizes the user screen topic buttons to those user-selected topics of interest stored in said database; and, upon the user selecting a topic button and thereupon generating said screen pattern, the server searches for all stored data on that topic; and, upon the user selecting a topic button and thereupon generating said screen pattern, causing a search for all stored data on that topic; and upon the user selecting the desired communication function mode from the "tool" box section, communicating such stored data from the server in the appropriate user-selected communication mode over the Internet to the user screens, observable by all said users.

2. A method as claimed in claim 1 and in which the server provides object form representations for the stored information on each topic and, also, therein, identification of the users who have specified interest in such topic, and, in response to software control, the server dynamically tracks information on what other users of common topic interest are doing at the time of a user log-in and topic selection, supplying the user from the server database with object representation for each topic and each topic-interested user, thereby facilitating user cross-referencing.

3. A method as claimed in claim 2 and in which users of common topic interest using such cross-referencing, establish dialog through their respective said screen pattern communication-chatting sections by text in real time.

4. A method as claimed in claim 1 and in which the server data base stored topic information comprises archives e-mail, real-time communications, web page data, associated images and sounds, topic-specific software and files.

5. A method as claimed in claim 1 and in which the users communicate additional topic-specific information and dialog for growing the topic information stored in the server database.

6. A method as claimed in claim 1 and in which the topic information comprises educational subjects, the users comprise students and teachers and others in schools or other different geographical locations, and the method enables such students and teachers and others, by selection at their independent screens, to access the very same topic information and its presentation from the server; automatically to exchange user views, dialog and information relating thereto by Internet e-mail, web, text communication and other messaging as user selected; and automatically, by selection on their screens, user identifying and communicating and networking with other users and with the server, and in real-time without need to access or reference any other source of information, database or directory.

7. The method of claim 1 wherein users include students and teachers, and the student user station software creates the same virtual classroom atmosphere for all, wherein, irrespective of the diverse geographical locations and actual distances of the varied user stations, from one another and from the server, real-time interactions are enabled amongst students and teachers simultaneously as if they were all actually in the same room at the same time.

8. The method of claim 1 wherein the user station software creates the same virtual common room atmosphere for all, wherein, irrespective of the diverse geographical locations and actual distances of the varied user stations from one another and from the server, real-time interactions are enabled amongst the users simulating as if they were all actually in the same room at the same time.

9. The method of claim 8 and in which the central server controls said interactions and their ordering, and also the users participating therein at various times.

10. A system as claimed in claim 9 and in which means is provided to enable the users to communicate additional topic-specific information and dialog for growing the topic information stored in the server database.

11. A method as claimed in claim 1 and in which the users comprise persons of a group(s) having common topic interest and located at different geographical locations, and the method enables, by selection at their common-format but independent screens, user access to the very same selected topic information and its presentation from the server; and, through selection on their screens, automatically to exchange user dialog by Internet e-mail, web, text communication and other messaging, as desired; and automatically by selection at their screens to identify, communicate and network both with one another and with the server, and in real-time, without need to access or refer to any other source of information, data base or directory.

12. An information-providing and communicating system having, in combination, a software-controlled central server interfaced over the Internet with a plurality of widely geographically distributed user computer stations each equipped with similar software responsive to that of the server and operating in accordance with the method of claim 1.

13. The method of claim 1 wherein each user of the group of users constituting said list of users that selected common information topics, is enabled to specify a predetermined communication mode framework and to communicate in such mode with the central server, and wherein the server is enabled to dispatch such communications to each of the other users of said group and with each of such other users respectively and automatically receiving the information of that communication at their respective computer station screens in the format of their respective selected communication mode framework.

14. The method of claim 13 wherein each user, irrespective of that user's selected communications mode, is enabled to participate in the information communication by all other users of said group operating in different modes.

15. The method of claim 14 wherein some of the users may select synchronous communication mode frameworks such as said instantaneous messaging and chat, and web-access, and others may select asynchronous modes such as e-mail and discussion lists, and wherein each user is enabled at its respective computer station to observe the information of such mixed mode communications of all other users and irrespective of the mode selected by that user.

16. The method of claim 15 wherein a user selecting the e-mail communication mode is automatically enabled to receive the information contained in other user's communication in real-time chat and web access modes, and in a converted e-mail format.

17. The method of claim 14 wherein such participation involves translating between communication modes in synchronous and asynchronous modes.

18. The method of claim 14 wherein one or more of the sizing, special grouping and interaction ordering of said list of users interfacing with the central server is effected for controlling, moderating and configuring the intercommunication of information.

19. A system for organizing and integrating the use of a plurality of different types of Internet information and dialog communication techniques and for each of a plurality of different informational topics stored in central file server(s) interfacing through the Internet with a plurality of widely geographically separated and independent user computer stations, the system having, in combination, central file server means containing storage means containing (1) an index of a plurality of different informational topics, and (2) a personal information and identification directory on all the users of the plurality of user computer stations including their specific selected informational topics of interest;

means for storing also at such central file server(s) the files and other detailed information pertaining to each informational topic indexed in the database; means for connecting the server to the Internet, each user computer station being connected to the Internet and having similar software that generates a common type screen at each station containing selectable buttons for personal user identification and for each different information topic selected as of interest to the user; means for enabling said software, upon a user selecting a topic button, for thereupon generating a screen pattern of common format for each topic containing four primary selections:

(1) a "tool" bar section of "buttons" representing different selectable primary communications function modes including a plurality selected from the group consisting of e-mail, multi-media presentations, web-access, instantaneous messaging, real-time communication, personal information gathering, and custom software, (2) a message reader section displaying all e-mail messages sent by other users interested in the same informational topic, (3) a real-time text base communication-chatting or dialog section, and (4) a list of all the users who have selected the same information topic as of interest and who are currently on-line, cross-referenceable and configurable to specific of such users already known to or desired by the user;

the software further providing on said screen pattern a web-browsing window tuned to a topic-specific web page; and wherein, as the user logs in, means is provided at the server for identifying the user's personal identification and information in the database and means for thereupon customizing the user screen topic buttons to present thereon those topics of selected as of interest by the user and stored in said database; and, upon the user selecting a topic button and thereupon generating said screen pattern, means for causing a search for all stored data on that topic; and upon the user selecting the desired communication function mode from the "tool" box section, means for automatically thereupon communicating such data from the server in the appropriate user-selected communication mode over the Internet to the user screens, observable by all said users.

20. A system as claimed in claim 19 and in which the server is programmed with object form code representations for the stored information on each topic and, also, therein, with identification of the users who have specified interest in such topic, and, in response to server software, the server is provided with means for dynamically tracking information on what other users of common topic interest are doing at the time of a user log-in and topic selection, and means is provided for supplying the user from the server database with object representation for each topic and information on each topic-interested user, thereby facilitating user cross-referencing.

21. A system as claimed in claim 20 and in which means is provided to enable users of common topic interest to use such cross-referencing, and establish dialog through their respective said screen pattern communication-chatting sections by text in real time.

22. A system as claimed in claim 19 and in which the server data base stored topic information comprises archives e-mail, real-time communications, web page data, associated images and sounds, topic-specific software and files.

23. A system as claimed in claim 19 and in which the users include students and teachers and the user station software creates the same virtual classroom atmosphere for all, wherein, irrespective of the diverse geographical locations and actual distance of the varied user stations from one another and from the server, real-time interactions are enabled amongst students and teachers simulating as if they were all actually in the same room at the same time.

24. A system as claimed in claim 19 and in which the user station software creates the same virtual common room atmosphere for all, wherein, irrespective of the diverse geographical locations and actual distances of the varied user stations from one another and from the server, real-time interactions are enabled amongst the users simulating as if they were all actually in the same room at the same time.

25. A system as claimed in claim 24 and in which means is provided for controlling the interactions and their ordering, and also the users participating therein at varied times.

26. A system as claimed in claim 25 and in which there is provided one or more of "buttons" for "raising hand" to indicate a user desire to question or otherwise interact, for "requesting tutoring" to obtain explanation, assistance or supplemental information, and for "offering tutoring" by other users and others.

27. A method of organizing and integrating the use of a plurality of different types of Internet information and dialogue communication techniques and for each of a plurality of different informational topics with a common-interest group of separated and independent common interest users, that comprises, providing each user with a user computer station interfacing through the Internet with a central server and provided with similar software that generates a common type screen at each station containing a common "tool bar" with "buttons" for selecting different primary communication function modes, synchronous and asynchronous, enabling each user at that user's computer station independently to select on the screen a desired communication mode and convenient time frame for communication to the central server, enabling the central server to receive and communicate each user's communications to all other user computer stations of the group and in a manner that adapts among the different selected communication modes and time frames without limiting the ability of any user to communicate with any other user, regardless of the communicaiton mode chosen.

28. The method of claim 27 wherein the different communication modes include e-mail, real time chatting, web page browsing, and off-line discussion lists.

29. The method of claim 28 wherein, for the case of a user selection of an asynchronous communication mode such as e-mail, and a communication received from another user who selected a synchronous mode such as real time chatting and web page browsing, the manner of adapting includes preparing said communication in e-mail format for the first-named user.

* * * * *